US007685278B2

(12) United States Patent
Cohen et al.

(10) Patent No.: US 7,685,278 B2
(45) Date of Patent: Mar. 23, 2010

(54) ADAPTING BAYESIAN NETWORK PARAMETERS ON-LINE IN A DYNAMIC ENVIRONMENT

(75) Inventors: Ira Cohen, Urbana, IL (US); Alexandre Bronstein, Palo Alto, CA (US); Marsha Prescott Duro, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1268 days.

(21) Appl. No.: 10/026,061

(22) Filed: Dec. 18, 2001

(65) Prior Publication Data
US 2003/0115325 A1 Jun. 19, 2003

(51) Int. Cl.
G06F 15/173 (2006.01)
G06F 15/18 (2006.01)
(52) U.S. Cl. .................... 709/225; 709/223; 706/14
(58) Field of Classification Search ......... 709/217–219, 709/223–225, 203–207; 706/16, 25, 45–52, 706/14
See application file for complete search history.

(56) References Cited

U.S. PATENT DOCUMENTS

| 6,076,083 | A  | * | 6/2000  | Baker ........................ 706/52 |
| 6,182,133 | B1 | * | 1/2001  | Horvitz ..................... 709/223 |
| 6,192,354 | B1 | * | 2/2001  | Bigus et al. ................. 706/46 |
| 6,249,781 | B1 | * | 6/2001  | Sutton ........................ 706/25 |
| 6,260,035 | B1 | * | 7/2001  | Horvitz et al. ............... 706/60 |
| 6,269,351 | B1 | * | 7/2001  | Black ........................ 706/15 |
| 6,807,537 | B1 | * | 10/2004 | Thiesson et al. .............. 706/52 |
| 2002/0019870 | A1 | * | 2/2002 | Chirashnya et al. ......... 709/224 |
| 2002/0138492 | A1 | * | 9/2002 | Kil ............................. 707/100 |
| 2003/0018494 | A1 | * | 1/2003 | Bronstein et al. ............. 705/2 |
| 2003/0028651 | A1 | * | 2/2003 | Schreckengast et al. ..... 709/229 |

OTHER PUBLICATIONS

Eric et al, In Proceedings of the Thirteen Annual Conference on Uncertainly in Artificial Intelligence (UAI-97), pp. 3-13, Providence, Rhode Island, Aug. 1-3, 1997.*

* cited by examiner

*Primary Examiner*—Yasin M Barqadle

(57) ABSTRACT

A method for adapting a Bayesian network includes determining a set of parameters for the Bayesian network, for example, initial parameters, and then updating the parameters in response to a set of observation data using an adaptive learning rate. The adaptive learning rate responds to any changes in the underlying modeled environment using minimal observation data.

23 Claims, 3 Drawing Sheets

ADAPTING BAYESIAN NETWORK PARAMETERS ON-LINE IN A DYNAMIC ENVIRONMENT

BACKGROUND OF THE INVENTION

1. Field of Invention

The present invention pertains to the field of automated reasoning. More particularly, this invention relates to Bayesian networks in automated reasoning.

2. Art Background

Bayesian networks are commonly used for automated reasoning in a wide variety of applications. Typically, Bayesian networks are used to model an underlying system or environment of interest. For example, Bayesian networks may be used to model biological systems including humans and animals, electrical systems, mechanical systems, software systems, business transaction systems, etc. Bayesian networks may be useful in a variety of automated reasoning tasks including diagnosing problems with an underlying system, determining the health of an underlying system, and predicting future events in an underlying system to name a few examples.

A typical Bayesian network is a graph structure having a set of nodes and interconnecting arcs that define parent-child relationships among the nodes. A Bayesian network also includes a set of Bayesian network parameters which are associated with the nodes of the graph structure. Typically, the nodes of a Bayesian network are associated with events or characteristics of the underlying modeled environment and the Bayesian network parameters usually indicate partial causalities among the events or characteristics associated with the nodes. The Bayesian network parameters are commonly contained in conditional probability tables associated with the nodes. Typically, a Bayesian network describes the joint probability of random variables each of which is represented by a node in the graph.

The Bayesian network parameters are commonly obtained from experts who possess knowledge of the behaviors or characteristics of the underlying modeled environment. Alternatively, the Bayesian network parameters may be obtained using observations of the underlying modeled environment. Unfortunately, environments may exist for which experts are unavailable or prohibitively expensive. In addition, environments may exist for which observation data is scarce or in which the underlying environment changes and renders past experience or observations obsolete.

SUMMARY OF THE INVENTION

A method is disclosed for adapting a Bayesian network. A Bayesian network may be adapted to changes in the underlying modeled environment using the present techniques even when observation data is relatively scarce and in an on-line dynamic environment. The present method includes determining a set of parameters for the Bayesian network, for example, initial parameters, and then updating the parameters in response to a set of observation data using an adaptive learning rate. The adaptive learning rate responds to any changes in the underlying modeled environment using minimal observation data.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
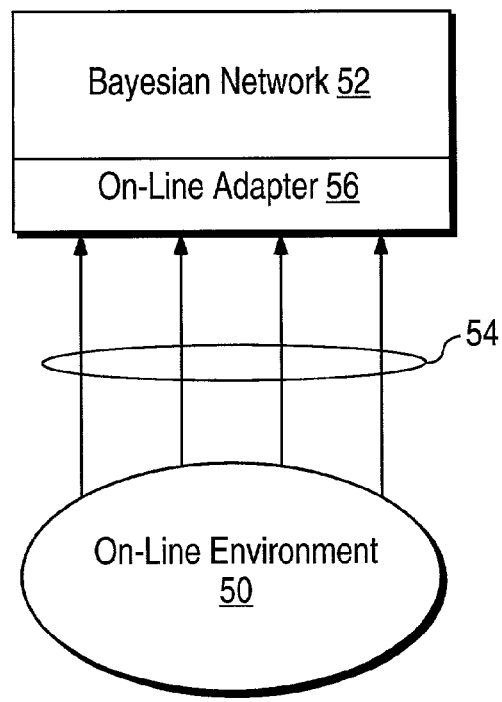
FIG. 1 shows an on-line adapter which adapts a Bayesian network according to the present teachings.

FIG. 1 shows an on-line adapter 56 which adapts a Bayesian network 52 according to the present teachings. The Bayesian network 52 performs automated reasoning with respect to an on-line environment 50. The on-line adapter 56 obtains a set of observation data 54 from one or more elements of the on-line environment 50 and adapts the parameters of the Bayesian network 52 in response to the observation data 54.

The present techniques enables adaptation of the parameters of the Bayesian network 52 in response to changes in the on-line environment 50 even when the observation data 54 is relatively scarce and/or when some of values in the observation data 54 from elements of the on-line environment 50 are unavailable. For example, at any given time values from a subset of the hardware/software elements of the on-line environment 50 may be unavailable due to hardware/software failures and/or due to the nature of events in the on-line environment 50.

The on-line environment 50 may be the hardware/software elements of an email system, an e-commerce system, a database system, or any type of distributed application to name a few examples.

Figure 2:
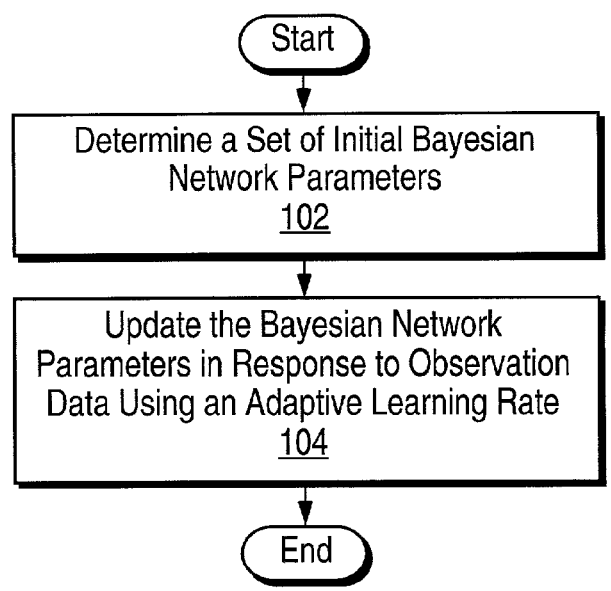
FIG. 2 shows a method for adapting Bayesian network parameters according to the present teachings.

FIG. 2 shows a method for adapting Bayesian network parameters according to the present teachings. At step 102, a set of initial Bayesian network parameters are determined. At step 104, the Bayesian network parameters are updated in response to a set of observation data using an adaptive learning rate. The step 104 may be repeated for each of a set of observation data records.

Figure 3:
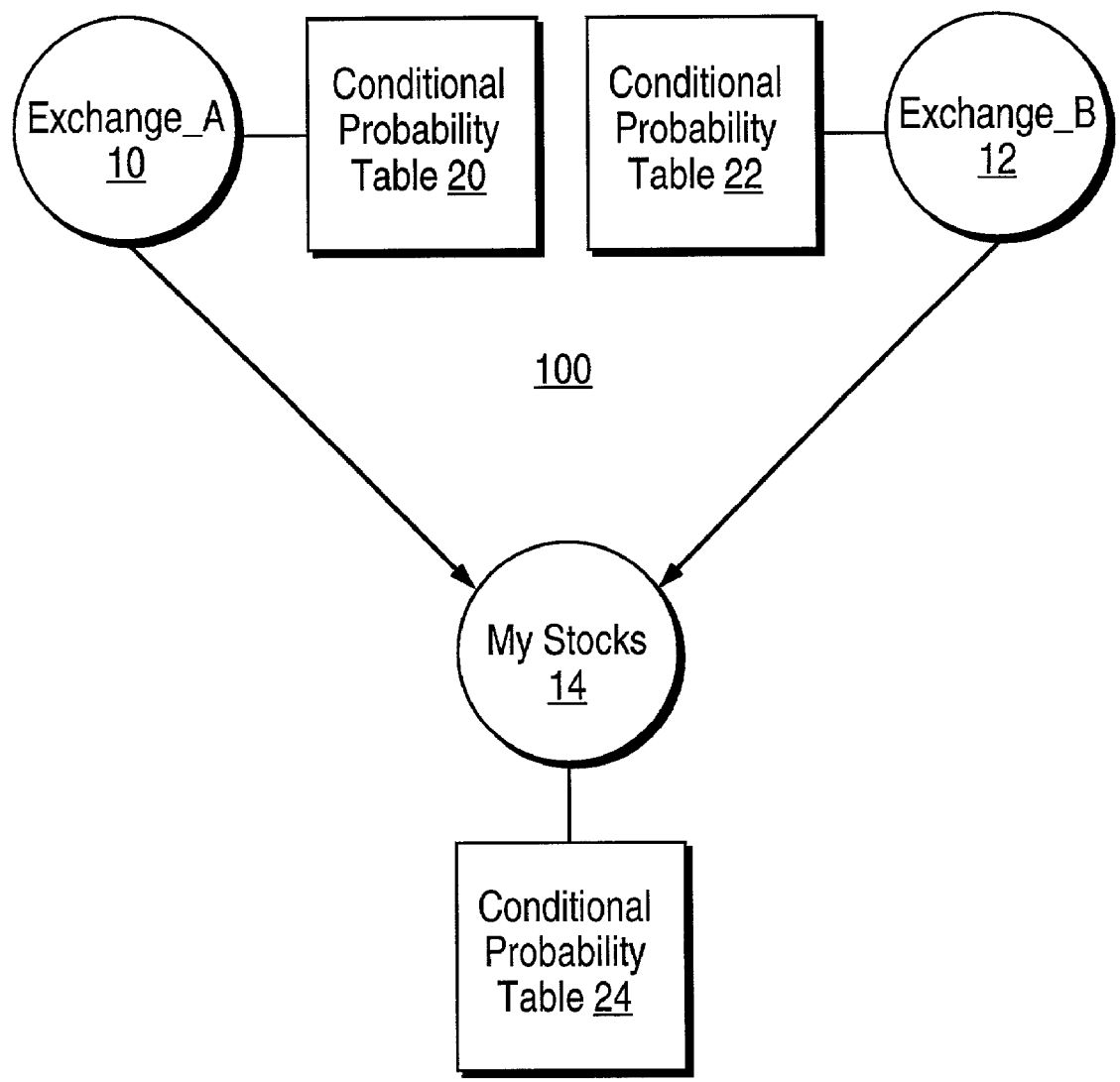
FIG. 3 shows an example Bayesian network for illustrating the present techniques.

FIG. 3 shows an example Bayesian network 100 for illustrating the present techniques. The Bayesian network 100 includes a set of nodes 10-14. The node 10 corresponds to a variable (EXCHANGE_A) which indicates whether a stock exchange A is up (U) or down (D) in terms of change in value. The node 12 corresponds to a variable (EXCHANGE_B) which indicates whether a stock exchange B is up or down. The node 14 corresponds to a variable (MY_STOCKS) which indicates whether the value of a set of stocks associated with the stock exchanges A and B and held by a particular individual is up or down.

The nodes 10-14 have associated conditional probability tables 20-24, respectively, for holding the parameters of the Bayesian network 100. The conditional probability tables 20-24 are written with a set of initial Bayesian network parameters determined at step 102.

An example set of initial Bayesian network parameters in the conditional probability table 20 is as follows:

| entry | D | U |
|---|---|---|
| 0 | 0.2 | 0.8 |

Entry 0 in the conditional probability table 20 indicates that the probability that the variable EXCHANGE_A=D is 20 percent and the probability that the variable EXCHANGE_A=U is 80 percent under all conditions.

An example set of initial Bayesian network parameters in the conditional probability table 22 is as follows:

| entry | D | U |
|---|---|---|
| 0 | 0.3 | 0.7 |

Entry 0 in the in the conditional probability table 22 indicates that the probability that the variable EXCHANGE_B=D is 30 percent and the probability that the variable EXCHANGE_B=U is 70 percent under all conditions.

An example set of initial Bayesian network parameters in the conditional probability table 24 are as follows:

| entry | EXCHANGE_A | EXCHANGE_B | D | U |
|---|---|---|---|---|
| 0 | D | D | 0.5 | 0.5 |
| 1 | D | U | 0.5 | 0.5 |
| 2 | U | D | 0.5 | 0.5 |
| 3 | U | U | 0.5 | 0.5 |

Entry 0 in the in the conditional probability table 24 indicate that the probability that the variable MY_STOCKS=D is 50 percent and that the probability that the variable MY_STOCKS=U is 50 percent given that EXCHANGE_A=D and EXCHANGE_B=D. Similarly, entries 1-3 in the conditional probability table 24 indicate that the probability that the variable MY_STOCKS=D is 50 percent and that the probability that the variable MY_STOCKS=U is 50 percent given that all remaining combinations of conditions of EXCHANGE_A and EXCHANGE_B.

At step 104, the Bayesian network parameters contained in the conditional probability table 24 are updated in response to the following example set of observation data:

EXCHANGE_A=U
EXCHANGE_B=D
MY_STOCKS=D

This example observation data corresponds to entry 2 in the conditional probability table 24 with the conditions EXCHANGE_A=U and EXCHANGE_B=D.

Entry 2 is updated at step 104 in response to the example observation as follows. The new probability that MY_STOCKS=D given that EXCHANGE_A=U and EXCHANGE_B=D equals $\eta+(1-\eta)$ times the previous probability that MY_STOCKS=D given that EXCHANGE_A=U and EXCHANGE_B=D, where $\eta$ is an adaptive learning rate which is a number between 0 and 1. This increases the probability that MY_STOCKS=D given that EXCHANGE_A=U AND EXCHANGE_B=D.

In addition, the probability that MY_STOCKS=U given that EXCHANGE_A=U and EXCHANGE_B=D is decreased at step 104 as follows. The new probability that MY_STOCKS=U given that EXCHANGE_A=U and EXCHANGE_B=D equals $(1-\eta)$ times the previous probability that MY_STOCKS=U given that EXCHANGE_A=U AND EXCHANGE_B=D.

The updated conditional probability table 24 after step 104 is as follows:

| entry | EXCHANGE_A | EXCHANGE_B | D | U |
|---|---|---|---|---|
| 0 | D | D | 0.5 | 0.5 |
| 1 | D | U | 0.5 | 0.5 |
| 2 | U | D | $\eta + (1-\eta) \cdot 0.5$ | $(1-\eta) \cdot 0.5$ |
| 3 | U | U | 0.5 | 0.5 |

The following generalized description enables adaptation for systems including on-line environments in which some of the values in the observation data 54 are unavailable. In the following, $Z_i$ is a node in a Bayesian network that takes any value from the set:

$$\{Z_i^1, \ldots, Z_i^{ri}\}$$

$Pa_1$ is the set of parents of $Z_i$ in the Bayesian network that take on of the configurations denoted by the following:

$$\{pa_i^1, \ldots, pa_i^{qi}\}$$

For the Bayesian network 100 example, if $Z_1$ is the node 14 then $Pa_1$ and $Pa_2$ are the nodes 10 and 12 and the configurations $\{pa_i^1, \ldots\}$ are DD, DU, UD, and UU.

An entry in the conditional probability table for the node $Z_i$ is given by the following:

$$\theta_{ijk} = P(Z_i = Z_i^k | Pa_i = pa_i^j)$$

A set of observation data cases D are represented as follows:

$$D = \{Y1, \ldots, Y\tau, \ldots\}$$

The update of the parameters for the conditional probability table for the node $Z_i$ is achieved by the following maximization (equation 1):

$$\hat{\theta} = \text{argmax}_\theta [\eta L_D(\theta) - d(\theta, \bar{\theta})]$$

where $L_D(\theta)$ is the normalized log likelihood of the data given the network, $d(\theta, \bar{\theta})$ is a distance between the two models and $\eta$ is the learning rate. In one embodiment, the distance is the Chi squared distance. The maximization is solved under the constraint that $\Sigma_k \theta_{ijk} = 1$ for $\forall i,j$.

For each new observation vector, the parameters for all conditional probability tables in a Bayesian network may be updated according to the following (equation 2):

$$\theta_{ijk}^\tau = \theta_{ijk}^{\tau-1} + \eta \left[ \frac{P(z_i^k, pa_i^j | y\tau, \theta^{\tau-1})}{P(pa_i^j | y\tau, \theta^{\tau-1})} - \theta_{ijk}^{\tau-1} \right]$$

for $$P(pa_i^j | y\tau, \theta^{\tau-1}) \neq 0$$

and $$\theta_{ijk}^\tau = \theta_{ijk}^{\tau-1}$$

otherwise.

This update process may be referred to as stochastic learning in which the term $$\frac{P(z_i^k, pa_i^j \mid y\tau, \theta^{\tau-1})}{P(pa_i^j \mid y\tau, \theta^{\tau-1})}$$

is an instantaneous gradient estimate of the constraint optimization problem.

The learning rate $\eta$ may be used to control the amount of reliance on past observation data when updating the conditional probability table parameters of a Bayesian network. As $\eta$ approaches 1 the past observation data is weighted less and the update of the parameters is based more on the present observation data. As $\eta$ approaches 0 the parameters are updated slowly from the previous parameters.

The update rule of equation 2 may be rewritten as follows (equation 3) assuming a constant learning rate $\eta$:

$$\theta_{ijk}^t = X_t = (1-\eta)X_{t-1} + \eta \cdot I_t$$

assuming with no loss of generality that $$P(pa_i^j \mid y_t, \theta^t) = 1$$

for all $t = \{1, \ldots T, \ldots\}$, i.e., the parents are always observed in their $j^{th}$ configuration. The assumption is a notational convention and not an actual restriction or constraint.

$I_t$ is an indicator function and the process $\{I_t\}$ an independent identically distributed Bernoulli random process given as $I_t=1$ with probability $\theta_{ijk}=c^*$ and $I_t=0$ with probability $1-c^*$ (equation 4) where $$c^* = P(X_i = x_i^k \mid Pa_i = pa_i^j)$$

is the true conditional probability table entry of the Bayesian network.

Given a discrete Bayesian network S, a sequence of full observation vectors D, the update rule given in equation 3, and the constraint $0 < \eta \leq 1$, it may be shown that the following properties hold:

Property 1; $X_t$ is a consistent estimate of $c^*$, i.e., $$E[X_t] = (1-\eta)^t X_0 + (1-(1-\eta)^t)c^*, \quad t \geq 0 \Rightarrow$$
$$\lim_{t \to \infty} E[X_t] = c^*$$

where $X_0$ is the initial value set at $t=0$.

Property 2; The variance of the estimate $X_t$ is finite and follows (equations 6 and 7):

$$\text{Var}[X_t] = \frac{\eta c^*(1-c^*)}{2-\eta}(1-(1-\eta)^{2t+2}) \Rightarrow \lim_{t \to \infty} \text{Var}[X_t] = \frac{\eta}{2-\eta}c^*(1-c^*)$$

Property 3; For $t \to \infty$ the following inequality holds:

$$P(|X_t - c^*| \geq q\sigma) \leq \frac{1}{q^2}$$

for any $q > 0$.

It is apparent that in the mean the online update rule of equation 3 approaches true values for Bayesian network parameters. The learning rate $\eta$ controls the rate of convergence. A setting of $\eta=1$ yields the fastest convergence with the largest variance. Smaller values of $\eta$ yields slower convergence with smaller variance. The variance is proportional to $\eta$ and remains finite in the limit and thus the estimate for a Bayesian network parameter oscillates around its true value. The learning rate $\eta$ may be viewed as a forgetting bias of the learning algorithm so that the system forgets the past at an exponential rate proportional to $\eta$.

Property 3 provides the confidence intervals of an estimated Bayesian network parameter with respect to the variance of the estimate. Property 3 may be employed in adapting the learning rate $\eta$ to changes in the underlying modeled environment.

Figure 4:
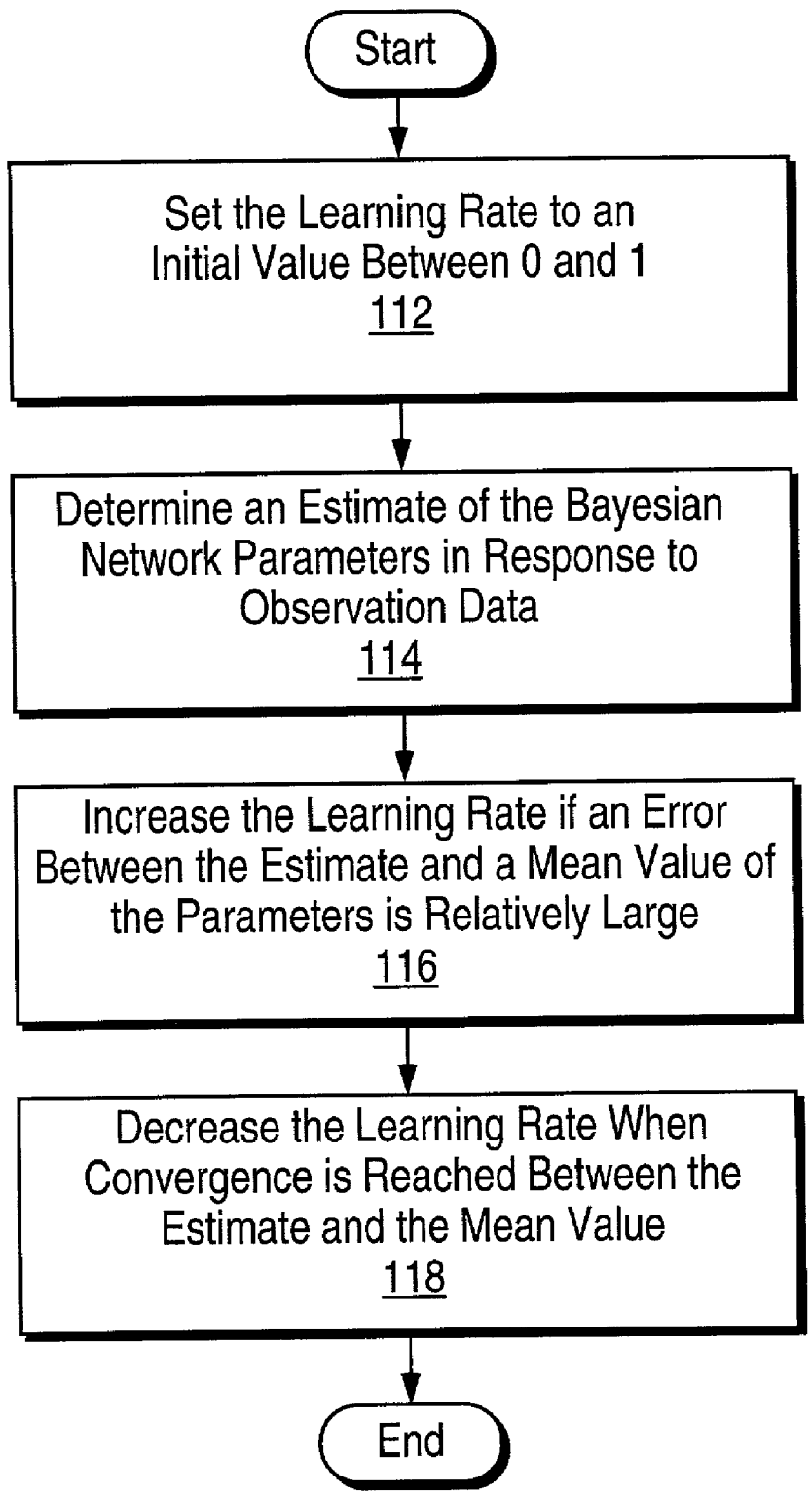
FIG. 4 shows a method for determining an adaptive learning rate according to the present teachings.

FIG. 4 shows a method for adapting the learning rate $\eta$ according to the present teachings. At step 112, the learning rate $\eta$ is initially set to a value between 0 and 1. The learning rate $\eta$ in one embodiment is set to a relatively high value at step 112.

At step 114, an estimate of the Bayesian network parameters for an underlying modeled environment is determined in response to a set of observation data. The estimate of the Bayesian network parameters may be obtained using equation 2 given above.

At step 116, the learning rate $\eta$ is increased if an error between the estimate obtained at step 114 and a mean value of the Bayesian network parameters for the underlying modeled environment is relatively large. A relatively large error may occur, for example, when the modeled underlying environment changes. In one embodiment, a large error is indicated by the inequality stated in property 3 above.

Otherwise at step 118, the learning rate $\eta$ is decreased when convergence is reached between the estimate determined at step 114 and the mean value of the Bayesian network parameters for the underlying modeled environment.

In the following example embodiment, a different learning rate is assigned for each set of parameters of a Bayesian network, i.e. for each node $Z_i$ with parents $Pa_i$ and parent's configuration $pa_i^j$ the learning rate is denoted as $\eta_{ij}$. Letting T denote the total number of observation data, t denote the number of times $Pa_i = pa_i^j$, and $\delta t$ denote the number of times $Pa_1 = pa_i^j$ since the last time $\eta_{ij}$, the schedule for adapting the learning rate is as follows.

Initialize the following:

Set $P[X_i = x_i^k \mid Pa_i = pa_i^j] = \theta_{ijk}^t$ to an initial value for $k=1, \ldots, r_i$.

Set $\eta_{ij}$ to a value between 0 and 1. For example a high value may be initially set.

Set t, $\delta t = 0$.

Given an observation vector $y_T$, if $Pa_1 = pa_1^j$ then do the following:

Step 1: Estimate $\theta^{t+1}_{ijk}$ using equation 3 where $\eta$ is replaced by $\eta_{ij}$.

Step 2: If $|\theta^{t+1}_{ijk} - E[\theta^{t+1}_{ijk}]| > q\sigma^{t+1}_{ij}$ then increase $\eta_{ij}$: set $\eta_{ij} = \eta_{ij} \cdot m, \backslash\backslash m > 1$ set $\delta t = 0$ Else if $(1-\eta_{1j})^{\delta t} \leq \alpha \backslash\backslash \alpha << 1$ decrease $\eta_{ij}$: set $\eta_{ij} = \eta_{ij} \cdot m^{-1}$ set $\delta t = 0$ Else set $\delta t = \delta t + 1$ Step 3: Get the next observation and repeat steps 1-2.

The parameters q, m, and $\alpha$ are adjustable. The parameter q determines the confidence in the decision to increase $\eta$. The parameter $\alpha$ is a threshold reflecting the acceptable convergence of the parameters. $E[\theta^{t+1}{}_{ijk}]$ and $\sigma^{t+1}{}_{ij}$ are the mean and variance of the estimated parameter. The mean may be estimated by a running average to be reset each time $\eta_{ij}$ is increased. The variance may be estimated according to equation 6 with t replaced by δt and with c*=0.5 which provides the worst case estimate of the variance.

It may be shown that the rate of decrease of $\eta_{ij}$ is proportional to $1/t_n$ where $t_n$ is the number of times $Pa_i = pa_1{}^j$ until the n'th reduction of $\eta$. This rate is consistent with an optimal annealing rate $1/t$. In the following analysis it is assumed that $\eta_{ij}$ is not increased at any point in time. If $\eta_{ij}$ is increased, t is reset to zero and the analysis still holds.

Using the reduction rule outlined above, with $\eta_{ij}(0) = \eta_0$ and for $t_n \leq t < t_{n-1}$ the learning rate $\eta_{ij}(t)$ is bounded by the following:

$$\frac{\log(\alpha^{-1})}{m-1} \frac{1}{t_n + K + \log(\alpha^{-1})n} \leq \eta_{ij}(t) < \frac{\log(\alpha^{-1})}{m-1} \frac{1}{t_n - n + K}$$

where $$K = \frac{\log(\alpha^{-1})}{n_0(m-1)}, 0 < \alpha < 1, m > 1, n \in \mathbb{N}.$$

The bounds become tighter as $t_n$ increases. $\eta_{ij}$ is reduced at discrete steps which increase in length as t increases. Therefore, $\eta_{ij}$ will have longer intervals at which it remains constant but at the end of the interval it reduces as $1/t$. When the error between the current estimate and its mean value remains small, $\eta_{ij}$ reduces with the optimal schedule. At the limit the estimated Bayesian network parameters converge to the target parameters with zero-error. If the error becomes large, $f_{ij}$ increases which increases the ability to adapt faster to changes in the modeled environment or break out of a local maxima. The time origin is effectively shifted forward each time $\eta_{ij}$ is increased, which yields a method that is substantially insensitive to an absolute time origin.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for adapting a Bayesian network, comprising:
generating a set of parameters for the Bayesian network in response to a set of past observation data such that the Bayesian network models an environment having at least hardware elements;
obtaining a set of present observation data from the environment;
determining an estimate of the parameters in response to the present observation data;
adapting a learning rate for the parameters such that the learning rate responds to changes in the environment indicated in the present observation data by increasing the learning rate when an error between the estimate and a mean of the parameters is relatively large and decreasing the learning rate when convergence is reached between the estimate and the mean of the parameters;
updating the parameters in response to the present observation data using the learning rate; and
using the Bayesian network to model the environment and diagnose problems or predict events in the environment.

2. The method of claim 1, wherein adapting the learning rate comprises adapting a different learning rate for each parameter of the Bayesian network.

3. The method of claim 2, wherein the estimate comprises an estimated value for a particular one of the parameters, and the mean comprises a mean value for the particular parameter, and wherein adapting the learning rate is based on the estimated value and mean value for the particular parameter.

4. The method of claim 1, wherein a subset of values in the present observation data is unavailable when updating the parameters.

5. The method of claim 1, wherein the environment is an online environment.

6. The method of claim 5, wherein the online environment is an email system.

7. The method of claim 5, wherein the online environment is an e-commerce system.

8. The method of claim 5, wherein the online environment is a database system.

9. The method of claim 1, wherein updating the parameters comprises determining an initial set of the parameters and then updating the parameters in response to the present observation data using the learning rate.

10. The method of claim 1, wherein the mean of the parameters comprises a mean value for each of the parameters.

11. The method of claim 1, wherein the mean is a running average of values of at least one of the parameters.

12. The method of claim 1, wherein the learning rate is increased in response to the error between the estimate and the mean being greater than a particular value, and the learning rate is decreased in response to the error between the estimate and the mean being less than a threshold.

13. A system, comprising:
an environment having at least hardware elements to generate a set of present observation data;
a Bayesian network to perform automated reasoning for the environment in response to the present observation data;
an adapter to obtain the present observation data from the environment and to determine an estimate of a set of parameters for the Bayesian network in response to the present observation data, the adapter to adapt a learning rate for the parameters to respond to changes in the environment by increasing the learning rate when an error between the estimate and a mean of the parameters is relatively large and decreasing the learning rate when convergence is reached between the estimate and the mean of the parameters, wherein the Bayesian network is configured to model the environment and diagnose problems or predict events in the environment.

14. The system of claim 13, wherein the adapter is configured to use a different learning rate for each parameter of the Bayesian network.

15. The system of claim 14, wherein the estimate comprises an estimated value for a particular one of the parameters, and the mean comprises a mean value for the particular parameter, and wherein adapting the learning rate is based on the estimated value and mean value for the particular parameter.

16. The system of claim 13, wherein the adapter is configured to determine the parameters by determining an initial set of the parameters and then to update the parameters in response to the present observation data using the learning rate.

17. The hardware system of claim 13, wherein a subset of values in the present observation data is unavailable.

18. The hardware system of claim 13, wherein the environment is an email system.

19. The hardware system of claim 13, wherein the environment is an e-commerce system.

20. The hardware system of claim 13, wherein the environment is a database system.

21. The system of claim 13, wherein the mean of the parameters comprises a mean value for each of the parameters.

22. The system of claim 13, wherein the mean is a running average of values of at least one of the parameters.

23. The system of claim 13, wherein the learning rate is increased in response to the error between the estimate and the mean being greater than a particular value, and the learning rate is decreased in response to the error between the estimate and the mean being less than a threshold.

* * * * *